(12) United States Patent
MacDougall et al.

(10) Patent No.: US 6,601,411 B2
(45) Date of Patent: Aug. 5, 2003

(54) METHOD FOR ANNEALING AN OPTICAL WAVEGUIDE HAVING A BRAGG GRATING TO ACCELERATE AGEING

(75) Inventors: Trevor W. MacDougall, Simsbury, CT (US); Martin A. Putnam, Cheshire, CT (US); Mark R. Fernald, Enfield, CT (US)

(73) Assignee: CiDRA Corporation, Wallingford, CT (US)

(*) Notice: Subject to any disclaimer, the term of this patent is extended or adjusted under 35 U.S.C. 154(b) by 106 days.

(21) Appl. No.: 09/751,672

(22) Filed: Mar. 26, 2001

(65) Prior Publication Data

US 2002/0178755 A1 Dec. 5, 2002

(51) Int. Cl.⁷ .............................................. C03B 37/00
(52) U.S. Cl. .............................. 65/378; 65/392; 65/394; 65/424; 65/384
(58) Field of Search .......................... 65/392, 394, 424, 65/378, 384

(56) References Cited

U.S. PATENT DOCUMENTS

| 5,235,659 A | * | 8/1993 | Atkins et al. ................ 385/124 |
| 5,287,427 A | * | 2/1994 | Atkins et al. ................ 385/124 |
| 5,620,496 A | | 4/1997 | Erdogan et al. .............. 65/425 |
| 6,137,931 A | | 10/2000 | Ishikawa et al. ............... 385/37 |
| 6,146,713 A | * | 11/2000 | Cullen et al. ................ 385/124 |
| 6,292,607 B1 | * | 9/2001 | Ishikawa et al. ............ 359/570 |

* cited by examiner

Primary Examiner—John Hoffmann
(74) Attorney, Agent, or Firm—Ware, Freesola, Van Der Sluys & Adolphson LLP (57) ABSTRACT

The present invention provides a method for annealing an optical waveguide, including an optical fiber or large-diameter waveguide structure, having along some length an induced refractive index difference that decays over time and so causes drift in the wavelength of reflected light when broadband light is inserted into the optical waveguide. The method uses an assumed decay formula for the induced refractive index difference indicating how the induced refractive index difference decays over time, the assumed decay formula having parameters that depend on temperature. The method includes the steps of: determining the (temperature dependent) parameters in the assumed decay formula for both an operating temperature and an annealing temperature, the annealing temperature being higher than the operating temperature, by fitting the observed decay over a measuring time at the two temperatures; and determining an anneal time at the annealing temperature based on a maximum allowed drift at the operating temperature. In operation, an optical waveguide is then annealed at the anneal temperature for the anneal time to provide a heat treatment (annealing) process for stabilizing Bragg gratings inscribed in the optical waveguide.

18 Claims, 5 Drawing Sheets

METHOD FOR ANNEALING AN OPTICAL WAVEGUIDE HAVING A BRAGG GRATING TO ACCELERATE AGEING

BACKGROUND OF INVENTION

1. Technical Field

The present invention relates to a method of annealing, and more particularly, to a method of annealing an optical fiber, an optical waveguide, or a glass tube, having a Bragg grating therein.

2. Description of Related Art

Fiber Bragg gratings have found widespread use in both telecommunications applications and other optical sensor applications. The telecommunications applications may include an optical fiber laser or an optical filter, while the optical sensor applications may include a pressure or temperature sensor in an oil well. Optical devices used in an oil well, which are extremely hazardous environments, are subjected to extremely high temperatures. The operating temperature in a telecommunications environment is substantially less than that for most other sensor applications (80° C. vs. typically 200° C. in for example an oil well environment). The lower operating temperature impacts the amount of stabilization or heat treatment needed to ensure stable operation. Typically, gratings are heat treated to provide some level of drift stabilization.

For example, U.S. Pat. No. 5,620,496 issued to Erdogan et al., hereinafter the '496 patent, describes a method for annealing an optical fiber having along some length a radiation induced refractive index difference as in a Bragg grating, i.e. a length along which there is a series of maxima of induced refractive index alternating with a series of minima of induced refractive index. When broadband light is injected into such an optical waveguide and encounters such a grating, some of it will be reflected. The reflected light will have a center wavelength that depends on the spacing between adjacent maxima, and also on the difference between the maximum induced index and the minimum induced index. The induced refractive index difference will decay over time, causing an undesirable drift in the value of the (center) wavelength of the light reflected by the grating. In the method of the '496 patent, one first monitors, at two temperatures above a desired operating temperature, using two similar optical fibers having a similarly written grating (written by exposure to the interference pattern of two ultraviolet radiation beams), changes over time of the induced refractive index difference, yielding a characteristic decay curve at one of the two temperatures as well as values for the constants of a formula used to extrapolate the decay curve to other temperatures. Next, one extrapolates the characteristic decay curve of the induced refractive index difference, for the operating temperature and for a predetermined annealing temperature (the annealing temperature being higher than the operating temperature so that the induced refractive index difference changes more quickly), and develops mathematically a required annealing time for annealing the optical fiber, the aim of the annealing being to accelerate the changes in the induced refractive index difference to a value that is sufficiently stable for use of the optical fiber in its target environment. More specifically; the induced refractive index difference is changed, by annealing at the annealing temperature, to a value that is such that further changes will be less than a predetermined acceptable amount in a predetermined period of operation at a predetermined operating temperature. In other words, once the optical fiber is annealed for the time determined by the method of the '496 patent, although the induced refractive index difference will continue to change, it will nevertheless not change significantly over a predetermined operating temperature time (of for example as much as 25 years) at a predetermined operating temperature.

As described in the '496 patent, an induced refractive index difference in an optical fiber is subject to decay with time and is described for the operating temperature by a characteristic decay curve. The optical fiber is designed to operate at a maximum operating temperature ($T_{op}$) for a predetermined operating period ($\tau_{op}$), with decay of the induced refractive index difference during the operating period resulting in a change of less than a predetermined amount over the period of operation.

As taught in the '496 patent, after writing a grating, i.e. inducing a refractive index difference pattern (by for example exposing the optical fiber thorough its cladding to an interference pattern created by the superposition of two coherent ultraviolet light beams), the characteristic decay curve of the induced refractive index difference is then determined for each of two different temperatures, each being greater than the operating temperature ($T_{op}$). A formula relating the decay curves at different temperatures is then assumed, and the measurements at the two different temperatures are used to determine the constants in the formula. Next, the decay curve at the operating temperature ($T_{op}$) is extrapolated from one or another of the higher temperature decay curves, using the assumed formula. Then, using the decay curve at the operating temperature, an operating temperature time ($t_{op}$) is determined after which the induced index will change by less than a predetermined acceptable amount. At the operating temperature time so determined, the operating temperature decay curve indicates the value for the induced refractive index difference to which the induced index must be lowered by annealing in order to stabilize the optical fiber. The operating temperature time and the corresponding induced refractive index difference are referred to in the '496 patent as a point P on the operating temperature decay curve. The grating is then heated at a predetermined anneal temperature ($T_{an}$) greater than the operating temperature ($T_{op}$) for an (accelerated) anneal time ($t_{an}$), which is less than the operating temperature time ($t_{op}$) in order to achieve a value of decay equivalent to the value represented by the point P on the operating temperature decay curve. The anneal temperature ($T_{an}$) and the anneal time ($t_{an}$) are determined using the equations set forth in the '496 patent.

The method of the '496 patent is based on a color center model, described therein. The '496 patent discloses that the color center model is the basis for the assumed formula for the characteristic decay curve of the induced refractive index difference. More specifically, what is modeled by the assumed formula and what is measured is the difference $\delta n(t)$ between the maximum and minimum induced index values at a time t, normalized by a quantity $\delta n_0$ that is the same difference at some reference time (for example, a time shortly after exposure of the optical fiber to ultraviolet radiation to induce, in places, a change in the index). Such a normalized refractive index difference is assumed in the '496 patent to vary with time, and so yield a characteristic decay curve, according to the formula:

$$R(t) \equiv \frac{\delta n(t)}{\delta n_0} = \frac{1}{1+\beta \cdot t^\alpha},$$

where the parameters $\alpha$ and $\beta$ f both depend on temperature, but do not depend on time. The value of $\alpha$ for the operating temperature $T_{op}$ is designated as $\alpha_{op}$ and so on. Thus, there is a characteristic decay curve at $T_{op}$ and a different characteristic decay curve at other temperatures with the same formula but different values for the parameters.

As mentioned above, the '496 patent also assumes how the parameters $\alpha$ and $\beta$ vary with temperature, thus allowing a determination at any temperature of the characteristic decay curve of the induced index (or more specifically, the decay curve for the ratio of differences) from the same curve at any other temperature. The '496 patent assumes that the temperature dependence of $\alpha$ and $\beta$ is given by the set of equations, $$\beta(T) = \beta_0 \exp(\gamma T), \text{ and } \alpha(T) = \frac{T}{T_0},$$

where $\beta_0$, $\gamma$, and $T_0$ are constants and are determined by measuring the characteristic decay curves at two temperatures higher than the operating temperature.

The method of the '496 patent is thus based on two assumptions: the formula for the characteristic decay curve (or, more specifically, the decay curve for the ratio of differences) and the formulae relating the values of the parameters of the characteristic decay curve at any temperature to the values of the parameters at any other temperature. The characteristic decay curve of the induced refractive index difference is never actually measured at the operating temperature. The accuracy of the method of the '496 patent relies on the accuracy of its two assumptions.

A similar approach is disclosed in U.S. Pat. No. 6,137,931 to Ishikawa et al., hereinafter called the '931 patent. There the ratio of differences is assumed to be given by the formula, $$R(t) \equiv \frac{\delta n(t)}{\delta n_0} = C_1 t^{-n(T)},$$

the ratio of differences there sometimes referred to as the secular change $R(t)$ of the normalized refractive index difference. Like the '496 patent, the approach taken in the '931 patent also assumes formulae for extrapolating the decay curve of the induced refractive index difference from one temperature to another. In the '931 patent, the extrapolation formulae are, for the parameter $C_1$, $C_1 \approx 1$, (independent of temperature), and for the parameter $n(T)$, the so-called law of Arrhenius, i.e.

$n(T) = \kappa \exp(-\gamma/T)$, where the constants $\kappa$ and $\gamma$ are said to be (approximately) independent of temperature (at least for a range of temperature). Thus, according to the '931 patent, the decay curve is measured for a range of temperatures and the constants $\kappa$ and $\gamma$ are determined so that $n(T)$ as given by the law of Arrhenius results in a good fit of the formula $R(t) = C_1 t^{-n(T)}$ to the measured decay curves. The decay curve at the operating temperature (or any other temperature) is then determined by inserting the operating temperature (or any other temperature) into the law of Arrhenius formula to determine $n(T)$ (and by using $C_1 = 1$). Knowing therefore the decay curves (algebraically, in closed form, with numerical values for all parameters and constants) at the operating temperature and at a predetermined annealing temperature, an anneal time can be determined, as in the '496 patent, to reduce the induced refractive index difference to a stable value. According to the '931 patent, using values for $\kappa$ $\gamma$ of 2.7914 and 1963.2, respectively, and using $C_1 = 1$, the anneal time $t_{an}$ for reaching the normalized refractive index difference $R_{stable}(t)$ needed for stability is given by, $$t_{an} = \exp\left\{\frac{\ln(R_{stable})}{-\kappa \exp(-\gamma/T_{an})}\right\},$$

where $R_{stable}(t)$ is determined by examining (as explained in the '931 patent) the decay curve for the normalized refractive index difference at the operating temperature $T_{op}$, the decay curve being given by, $$R(t) \equiv \frac{\delta n(t)}{\delta n_0} = C_1 t^{-n(T_{op})} = t^{-\kappa \exp(-\gamma/T_{op})}.$$

Both the '496 patent and the '931 patent therefore assume one or more equations used to determine by extrapolation the decay curve of the induced refractive index difference at the operating temperature. In the case of the '931 patent, it is acknowledged that the assumed formulae for the extrapolation are only approximate. In fact, drastically different values for the $\kappa$ and $\gamma$ parameters are indicated there for different ranges of temperature. The error inherent in such assumptions, although for some applications of no practical consequence, can be unacceptably large for applications where the optical fiber (or other optical device) is expected to remain stable for especially long times.

What is needed, therefore, is a way of determining an anneal time and temperature for an optical fiber, optical waveguide, or other optical device having in places an induced refractive index difference, that does not rely on determining the decay curve for the induced refractive index difference at the operating temperature based on measurements of the decay curve at other (higher) temperatures.

SUMMARY OF THE INVENTION

The present invention provides a novel method for determining a heat treatment (annealing) process for stabilizing fiber Bragg gratings (or any other structure created by inducing, in places, a change in the refractive index) in an optical fiber, optical waveguide, a glass tube, or other optical device.

In particular, the present invention provides a method for annealing an optical waveguide having along some lengths an induced refractive index difference that decays over time and so causes drift in the wavelength of reflected light when broadband light is inserted into the optical waveguide. The method uses an assumed decay formula for the induced refractive index difference indicating how the induced refractive index difference decays in time, the assumed decay formula having parameters that depend on temperature. The method includes the steps of: determining the parameters in the assumed decay formula for both an operating temperature and an annealing temperature, the annealing temperature being higher than the operating temperature, by determining values for the parameters so as to fit an observed decay over a measuring time at the operating temperature and at the annealing temperature; and determining an anneal time at the annealing temperature based on a maximum allowed drift at the operating temperature. In operation, an optical waveguide is then annealed at the anneal temperature for the anneal time to provide the necessary heat treatment (annealing) process for stabilizing a Bragg grating.

The technique described below uses actual measured data at the operating temperature ($T_{op}$) in conjunction with data measured at the anneal temperature ($T_{an}$), which is a temperature greater than the operating temperature, to determine a suitable annealing recipe and to predict the stability performance of the grating. The method of the present invention ensures stable operation with respect to wavelength drift (less than 0.1 picometers per week) of the Bragg grating after long exposure to high temperatures (greater than 150° C.)

The method may be used to anneal any optical waveguide having a Bragg grating (or having any other structure created by exposing, in places, the structure to an agent for changing the refractive index). For example, the method may be used to anneal the grating in an optical fiber or in a large-diameter waveguide cane or rod structure.

The foregoing and other objects, features and advantages of the present invention will become more apparent in light of the following detailed description of exemplary embodiments thereof, as illustrated in the accompanying drawings.

BRIEF DESCRIPTION OF THE DRAWINGS

The drawings (not drawn to scale) include various figures, and the following is a brief description thereof.

DETAILED DESCRIPTION OF THE INVENTION

The present invention will now be described in the particular application of annealing an optical fiber having a Bragg grating. But nothing about the invention restricts it to annealing an optical fiber having a Bragg grating. The invention applies equally to any type of grating-like structure, i.e. the invention is useful in annealing any material in which a refractive index is induced and will decay over time. Specifically, the present invention is intended to comprehend annealing not only optical fibers having a Bragg grating, but also large-diameter optical waveguide cane or rod structures, described below.

Figure 1A:
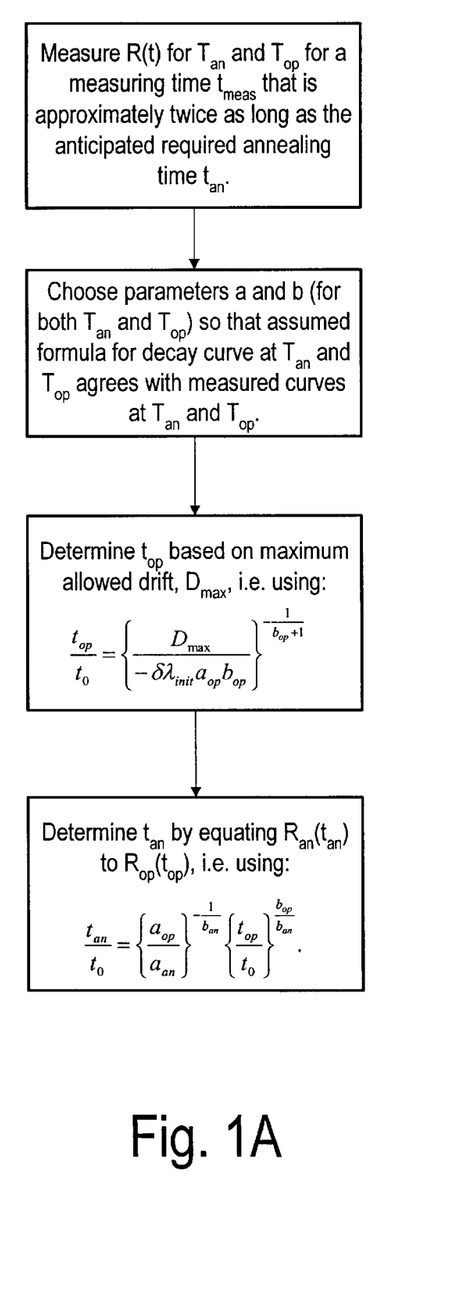
FIGS. 1A and 1B are flowcharts of the method of the present invention from two slightly different aspects, FIG. 1B illustrating the same steps as FIG. 1A except that FIG. 1B collapses the last two steps into a single step.
Figure 1B:
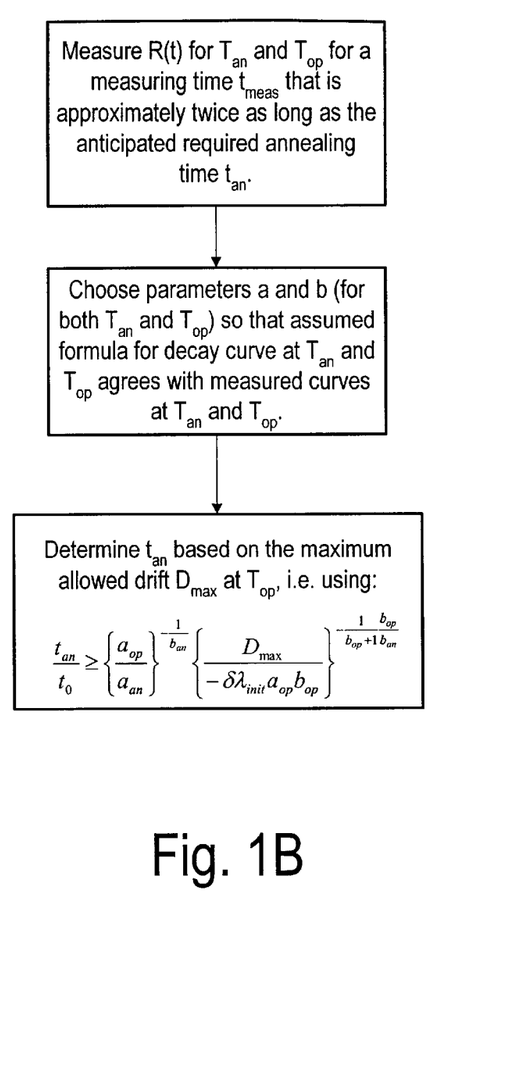

FIG. 1: The Basic Invention

FIGS. 1A and 1B show a method for annealing optical waveguides having an ultraviolet radiation induced refractive index difference, i.e. e.g. a grating. The method shown in FIG. 1B is the same as shown in FIG. 1A except that the last two steps in FIG. 1A are collapsed into a single step in FIG. 1B. The method is described herein in relation to annealing an optical fiber that typically has a core, a cladding thereabout, and an overall diameter of about 125 microns.

Figure 2A:
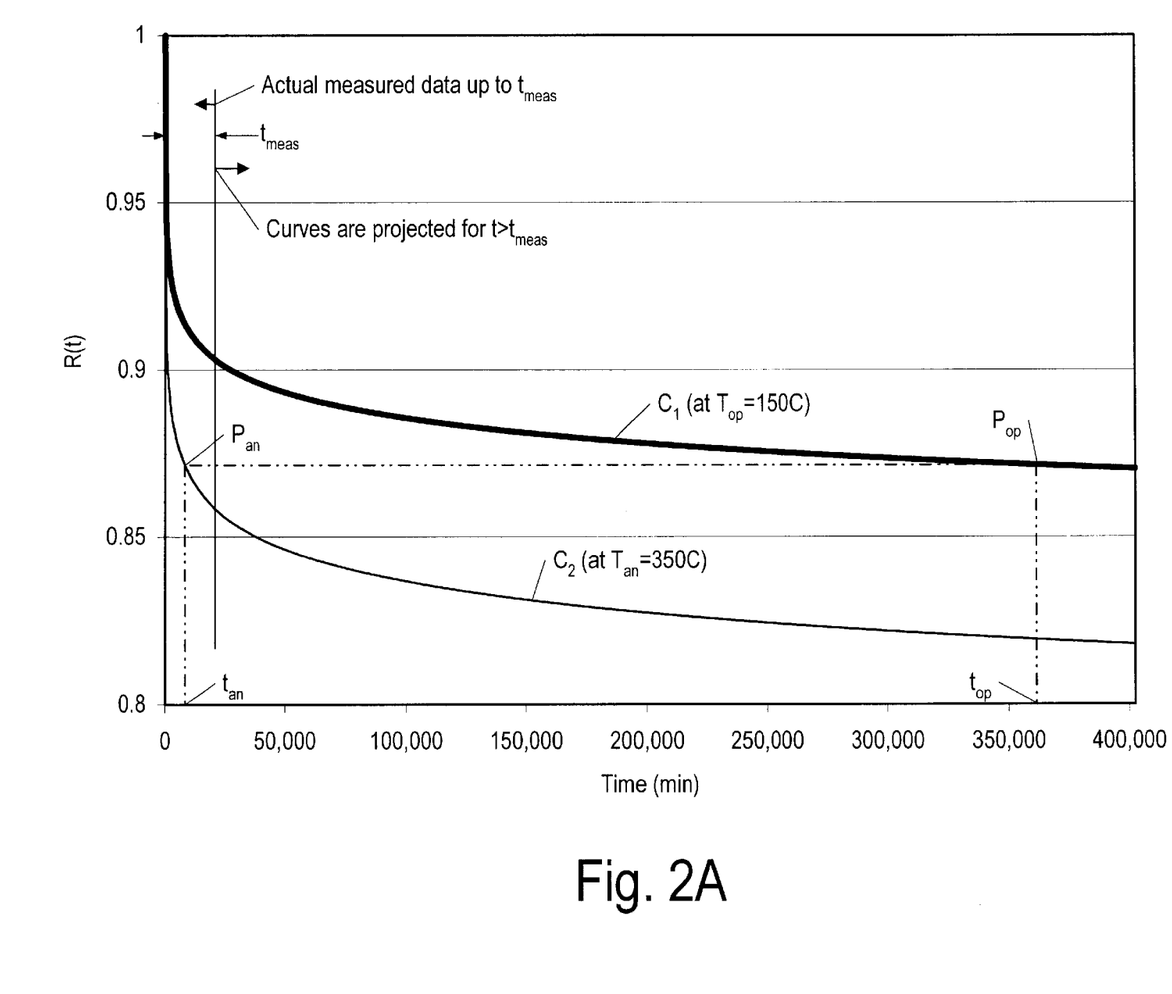
FIG. 2A is a graph of characteristic decay curves showing a normalized refractive index difference in relation to time for temperatures $T_{op}$ and $T_{an}$, with time varying first up to a measuring time, and then on to an operating temperature time $t_{op}$ after which a grating would be stable (according to predetermined criteria) if held at a predetermined operating temperature up to the operating temperature time.
Figure 2B:
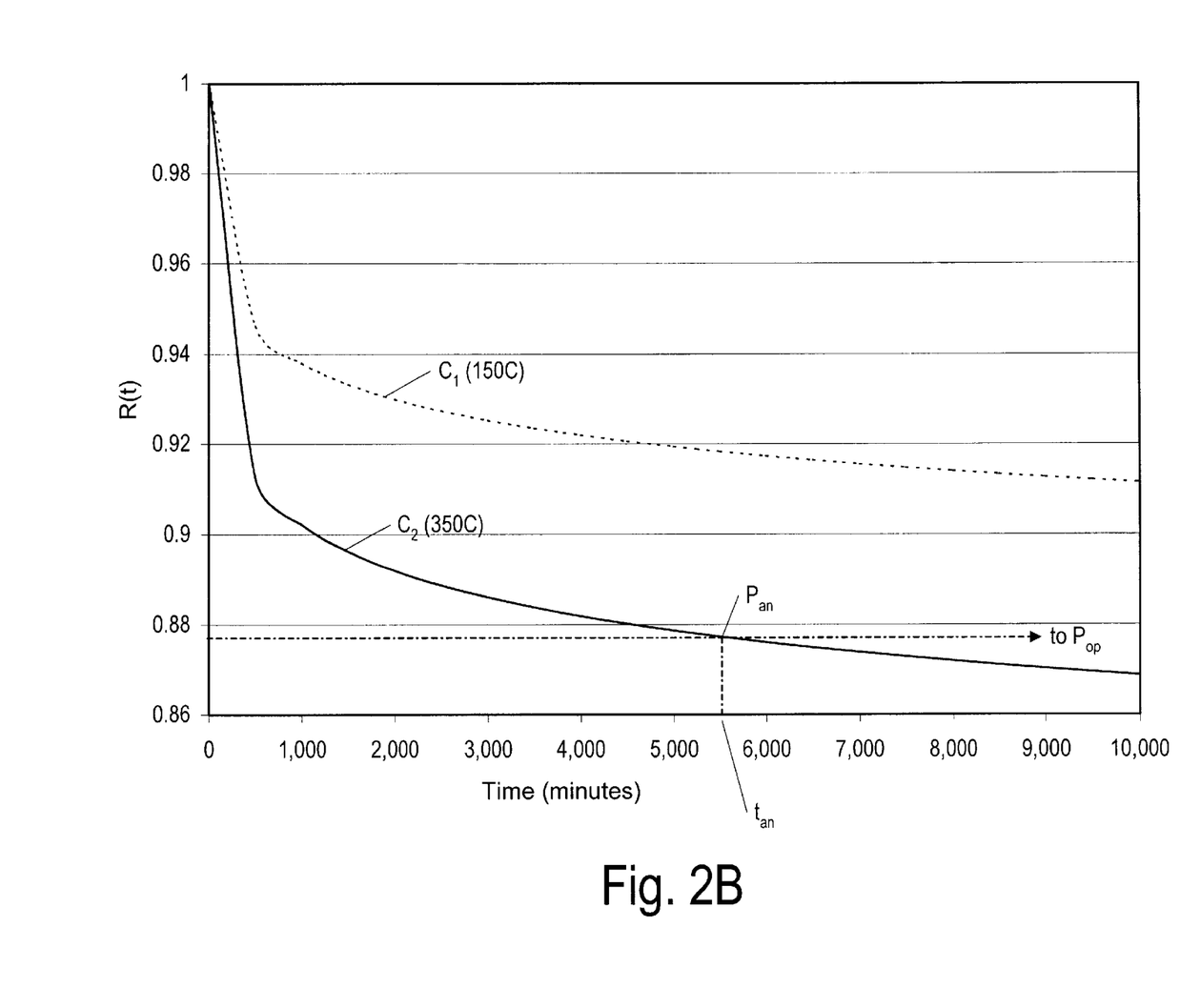
FIG. 2B is a closer view of the graph of FIG. 1A, showing in greater detail the time period up to the measuring time.

The method of the present invention assumes that the stability performance of a grating can be described with a power law formula as in the following equation:

$$R(t) \equiv \frac{\delta n(t)}{\delta n_0} = a\left(\frac{t}{t_0}\right)^{-b} \quad (1)$$

where: $R(t)$ is the normalized refractive index difference, and a plot of $R(t)$ versus time is here called a characteristic decay curve; $\delta n(t)$ is the refractive index difference at a time $t$; $\delta n_0$ is the refractive index difference at a reference time; $t_0$ is a normalization factor having the same units as the time $t$; and a and b are parameters describing the decay curve, parameters that depend on temperature, but not time. Thus, for example, for decay at an operating temperature $T_{op}$, there are parameters $a_{op}$ and $b_{op}$. Example characteristic decay curves are plotted in FIGS. 2A and 2B, discussed below.

As the refractive index difference of a grating decays, the center wavelength of light reflected from the grating changes (shifts). The value of the center wavelength can be related to the refractive index difference. For stability, what is wanted is that the rate of change of the center wavelength be acceptably small. The rate of change of the center wavelength is here called the wavelength drift.

The method of producing a stable grating is accomplished by annealing at a certain anneal temperature $T_{an}$, higher than the operating temperature $T_{op}$, for a certain amount of time, called the anneal time. The analysis for determining the temperature and time recipe and being assured that the recipe will yield the predicted performance over a long period of operation is the difficult part. As indicated in FIG. 1A, the strategy used here consists of three steps:

1) Determine the parameters $a_{an}$ and $b_{an}$ by measuring the decay curve at Tan and determine the parameters $a_{op}$ and $b_{op}$ by measuring the decay curve at $T_{op}$ (using another, similar grating), both measurements being performed over a relatively short period of time, typically 10,000 min, but at any rate for a time long enough to acquire for the decay curve at the annealing temperature data points beyond the (to be determined) stable point, i.e. so that the induced refractive index difference will have decayed beyond the (to be determined) value to which it is to be annealed. The sampling rate used by the inventors was approximately 1 data point per minute.

2) Determine, algebraically or graphically, a time $t_{op}$ after which the grating will be stable at $T_{op}$, i.e. after which the wavelength drift, as measured from that time, will be less than a pre-determined maximum allowable wavelength drift $D_{max}$; and 3) Determine, algebraically (or graphically), $t_{an}$, based on $t_{op}$ as determined in step 2, and using the corresponding value of the decay curve at $T_{op}$, i.e. $R(t_{op})$ for the operating temperature, and also knowing the decay curve at $T_{an}$.

FIG. 1B shows how steps (2) and (3) can be combined into a single step when the invention is viewed in its broadest aspect.

More specifically, referring now to FIG. 1A, the operating temperature parameters $a_{op}$ and $b_{op}$ are determined by monitoring the wavelength shift while the grating is held at a temperature $T_{op}$, and then fitting the wavelength shift as a function of time using Equation 2 below, or, alternatively, determining from the wavelength shift how the refractive index difference ratio varies with time, and choosing the operating temperature parameters $a_{op}$ and $b_{op}$ so that the assumed decay curve agrees with the measured data. The measurement is typically performed by injecting optical power from a broadband source, such as an erbium-doped superluminescent light source, sampling the reflected light, and determining the center wavelength of the reflected light.

Similarly, the anneal temperature parameters $a_{an}$ and $b_{an}$ are also obtained by monitoring the center wavelength and curve fitting, this time holding another, similar grating at the anneal temperature $T_{an}$.

The curve fitting used to determine values of the parameters $a_{an}$ and $b_{an}$ for the anneal temperature decay curve and of the parameters $a_{op}$ and $b_{op}$ for the operating temperature decay curve can be performed using any one of a number of different commercially available software packages. The inventors have successfully used the curve fitting software Origin (TM).

According to the invention, a grating is monitored, at both the annealing temperature and the operating temperature, for a time that is at least as long as twice the (to be determined) anneal time. Since the anneal time is not known in advance, iteration is required, but the iteration can be performed while the grating is being monitored, i.e. the anneal time can be continuously computed after enough measurements have been made to ensure reasonable certainty, and until the measurements indicate an anneal time that is approximately one half as long as the accumulated monitoring time. Data need be taken no more frequently than is necessary for a sensible change in the normalized refractive index difference to occur. To ensure stable operation over about a 20-year lifetime, the experimenters monitored a grating for about 10,000 minutes (about one week), and used a sampling rate of 1 sample per minute, in determining the a and b parameters for both the operating temperature decay curve and the annealing temperature decay curve.

As mentioned above, in order to determine for a grating the normalized refractive index difference decay curve at some temperature, what is actually measured is the shift in the center wavelength of light reflected by the grating. As mentioned above, the wavelength shift can be measured by injecting broadband light into the optical device, but it can also be determined by scanning with narrowband light. The wavelength shift as a function of time is given by:

$$\delta\lambda(t) = \{R(t) - 1\}\delta\lambda_{init} = \left\{a\left(\frac{t}{t_0}\right)^{-b} - 1\right\}\delta\lambda_{init} \qquad (2)$$

where $\delta\lambda_{init}$ is a factor determined so as to have equation (2) be correct at a reference time (such as the time $t=t_0$); it is determined based on measuring the reflected wavelength at a time immediately after first writing a grating and then again a short time later, and forming the difference.

The requirement that a grating be stable for a predetermined time of operation can be expressed as a requirement that the normalized refractive index difference not change by more than a certain amount over the time of operation, which is equivalent to requiring that the (center) wavelength reflected by the Bragg grating not shift by more than a corresponding certain amount over the time of operation. (The so-called Bragg wavelength, i.e. the center wavelength of light reflected by a Bragg grating, depends on both the spacing between where the refractive index is a maximum and also what is called the effective index, which depends on the difference between the maximum index and the minimum index of the grating.)

Alternatively, a second form of the stability requirement is that the rate of change of the (center) wavelength (called here the wavelength drift) drop (in magnitude) to a value that is less than a predetermined maximum allowable value. It is this second form of the stability requirement that is used in the present invention. From equation (2), the rate of change of the reflected wavelength, i.e. the wavelength drift, is, $$D(t) = \frac{d}{dt}\delta\lambda(t) = \delta\lambda_{init}\frac{d}{dt}R(t). \qquad (3)$$

To ensure stability, the optical device is annealed at an annealing temperature $T_{an}$ for an annealing time $t_{an}$ so that throughout the time of operation $D(t)$ is less (in magnitude) than some predetermined maximum allowed wavelength drift $D_{max}$, or in other words, that at the start of the time of operation, i.e. at $t=t_{op}$, the wavelength drift is less (in magnitude) than the maximum allowed wavelength drift, i.e. $|D(t_{op})|<|D_{max}|$. In one application of the invention, when used to anneal an optical device having a Bragg grating used as a component of a pressure sensor, the maximum allowed drift needed for stable operation was set to $|D_{max}|<2$ picometers/year (pm/yr).

With the previously determined parameters $a_{op}$ and $b_{op}$ for the operating temperature decay curve, the time $t_{op}$ at which the grating would become stable if held at the operating temperature for that time is calculated using:

$$\frac{t_{op}}{t_0} = \left\{\frac{D_{max}}{-\delta\lambda_{init}a_{op}b_{op}}\right\}^{-\frac{1}{b_{op}+1}}. \qquad (4)$$

The required time $t_{an}$ to anneal the grating at the (elevated) anneal temperature $T_{an}$ is determined by equating the operating temperature values and the anneal temperature values for the normalized refractive index difference, given by Equation (1), and solving for the anneal time, yielding:

$$\frac{t_{an}}{t_0} = \left\{\frac{a_{op}}{a_{an}}\right\}^{-\frac{1}{b_{an}}}\left\{\frac{t_{op}}{t_0}\right\}^{\frac{b_{op}}{b_{an}}}. \qquad (5)$$

Equivalently, the anneal time can be expressed in terms of the maximum allowed drift $D_{max}$ as $$\frac{t_{an}}{t_0} \geq \left\{\frac{a_{op}}{a_{an}}\right\}^{-\frac{1}{b_{an}}}\left\{\frac{D_{max}}{-\delta\lambda_{init}a_{op}b_{op}}\right\}^{-\frac{1}{b_{op}+1}\frac{b_{op}}{b_{an}}}. \qquad (6)$$

Usually a safety factor of two to three times is used for the annealing time, meaning that in an actual commercial application, devices are annealed for two to three times $t_{an}$ to ensure their quality.

Figure 3:
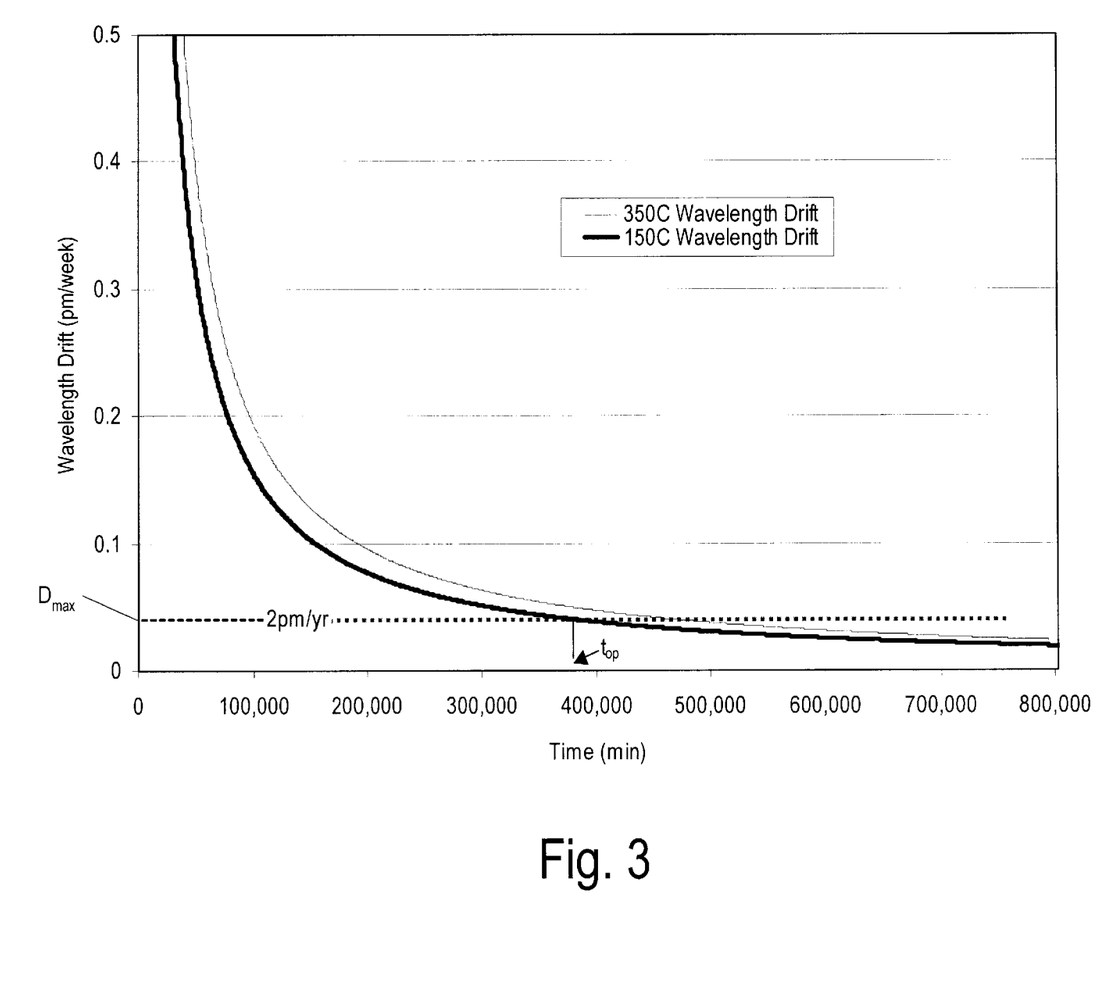
FIG. 3 is a graph of grating wavelength drift, showing wavelength drift (indicated in picometers/week) at $T_{op}$ in relation to time (indicated in minutes)

FIGS. 2A, 2B, and 3

Referring now to FIGS. 2A and 2B, the normalized refractive index difference R(t) at $T_{op}=150°$ C. is shown (curve $C_1$), and the refractive index difference R(t) at $T_{an}=350°$ C. is also shown (curve $C_2$). Curve $C_1$ has a point $P_{op}$ corresponding to a time $t_{op}\approx360,000$ min$\approx33$ weeks, after which further changes in the normalized refractive index difference R(t) are so small that the wavelength drift D(t) for operation at $T_{op}$ remains less in magnitude than $|D_{max}|\approx0.04$ pm/week (equivalent to less than 2 pm/yr), as shown in FIG. 3. FIG. 2A shows that the operating point $P_{op}$ corresponds to an anneal point Pan in that the two points have the same refractive index difference ratio R(t). Point $P_{an}$ corresponds to an anneal time $t_{an}\approx5600$ min (or about ½ of a week) at an anneal temperature of $T_{an}=350°$ C., which yields the same normalized refractive index difference R(t) as would an (impractical) annealing for the time $t_{op}$ of about 33 weeks, at a temperature of $T_{op}=150°$ C.

A pressure sensor for which the wavelength drift is required to be less in magnitude than a maximum allowable wavelength drift $D_{max}$ having a magnitude of 2 picometers per year is shown and described in U.S. patent application Ser. No. 09/455,867 (CiDRA File No. CC 0036B), filed Dec. 6, 1999, entitled "Bragg Grating Pressure Sensor," as well as United States patent application Ser. No. 09/455,865 (CiDRA File No. CC-0078B), filed Dec. 6, 1999, entitled "Tube Encased Fiber Grating," both hereby incorporated by reference in their entirety.

Figure 4:
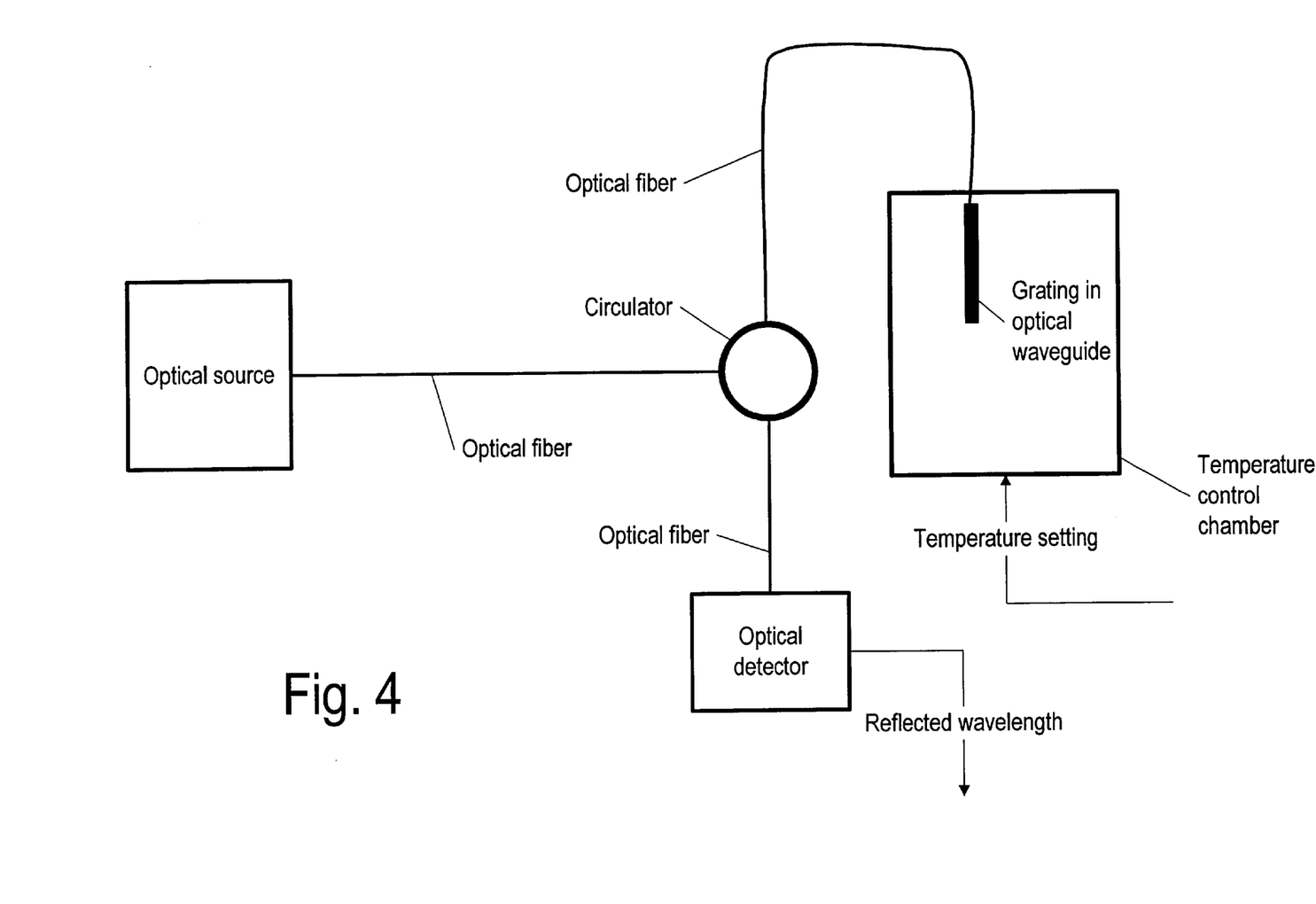
FIG. 4 is a schematic of an arrangement used to measure characteristic decay curves.

FIG. 4

Referring now to FIG. 4, an arrangement is shown for measuring the characteristic decay curves for the normalized refractive index difference at one or another temperature. The arrangement includes an optical source for providing broadband light or for providing narrowband light that is scanned over a predetermined range of wavelengths. The light provided by the light source is directed via a circulator to a grating held at a predetermined temperature in a temperature control chamber. Light having a center wavelength that depends on the normalized refractive index difference (as well as the spacing between regions of maximum index of refraction) is reflected by the grating, and the reflected light is directed via the circulator to an optical detector. The optical detector determines the center wavelength of the reflected light.

The Large-Diameter Waveguide Cane or Rod Structure

As discussed above, the optical waveguide may be in the form of a large-diameter waveguide cane or rod structure formed by taking an optical fiber and inserting it into an alignment tube having an inner diameter slightly larger than the outer diameter of the optical fiber, which is then collapsed onto the optical fiber. Such glass collapsing technology is shown and described in U.S. patent application Ser. No. 09/455,867 (CiDRA File No. CC-0036B), filed Dec. 6, 1999, as well as in United States patent application Ser. No. 09/455,865 (CiDRA File No. CC-0078B), filed Dec. 6, 1999, both hereby incorporated by reference in their entirety. In particular, such glass collapsing technology relates to collapsing an approximately 1 millimeter outer diameter tube having an approximately 132 micron inner diameter onto an optical fiber, then, optionally, further collapsing an approximately 3 millimeter tube onto the 1 millimeter tube.

Alternatively, such a large-diameter waveguide rod or cane structure may be formed as a single large-diameter waveguide having a core with Bragg gratings located therein. For examples of such embodiments of cane or rod structures, see U.S. patent application Ser No. 09/455,868 (CiDRA File No. CC 0230), filed Dec. 6, 1999, as well as U.S. patent application Ser. No. 09/456,112 (CiDRA File No. CC 0129D), filed Dec. 6, 1999, both hereby incorporated by reference in their entirety. In one embodiment described therein, a large-diameter waveguide cane structure has an outer cladding and an inner core in which light can propagate. The cladding has an outer waveguide dimension greater than about 0.3 millimeters. The core has an outer core dimension of less than about 12.5 microns.

Monitoring the Wavelength Shift

The method of the present invention monitors the wavelength shift of an optical signal from a Bragg grating. A person skilled in the art would appreciate that there are many known techniques and devices for detecting optical signals and monitoring the wavelength shift thereof, including those that use an optical spectrometer, such as the H.P. Multi-Wavemeter, part no. 86120B, with options H15, available from Hewlett Packard. In addition, there are available peak detecting or waveform center detection techniques that improve accuracy or decrease the number of sample points that must be acquired (and thus decrease the amount of time for practicing the invention). Such techniques and devices include those shown and described in a U.S. patent application Ser. No. 09/087,447, filed May 29, 1998, entitled "Method for Improving the Accuracy in the Determination of a Waveform Center," as well as a U.S. patent application Ser. No. 09/458,911, filed Dec. 10, 1999, entitled "Fiber Bragg Grating Peak Detection System and Method for Doing the Same", both assigned to the assignee of the instant patent application and hereby incorporated by reference in their entirety. Other techniques or devices may be used if desired to increase accuracy or efficiency. The scope of the invention is not intended to be limited to any particular technique for detecting an optical signal or monitoring wavelength shifts.

Comparison of the Invention with the Prior Art

In contrast to both the '496 patent and the '931 patent, both mentioned above, the method of the present invention calls for a direct measurement of the decay curve for the normalized refractive index difference at both the operating temperature and at the annealing temperature. The equations of the present invention include a and b parameters for both the operating temperature decay curve and the annealing temperature decay curve, parameters that are determined by fitting measured data obtained at the operating temperature and at the annealing temperature. No assumptions are made as to how the a and b parameters for one temperature might be related to the a and b parameters for any other temperature. The method of the present invention uses for example over 10,000 data points obtained over a measuring time $t_{meas}$ of approximately one week, holding one grating at the annealing temperature and another at the operating temperature, to determine a decay curve for the normalized refractive index difference at both the annealing temperature and at the operating temperature. The method then picks two sets of values for the a and b parameters of the assumed formula for the decay curve, one set of values for the annealing temperature, and one set for the operating temperature, so as to fit the measured data. The actually fitted normalized refractive index difference decay curve at $T_{op}$ (or, equivalently, the wavelength shift curve at $T_{op}$) is then used to find a point $P_{op}$ corresponding to a time $t_{op}$ after which wavelength drift (derived from the wavelength shift) will remain less in magnitude than a predetermined maximum allowable drift magnitude $|D_{max}|$. The point $P_{op}$ also corresponds to a refractive index difference ratio $R(t_{op})$, and through the value $R(t_{op})$, to an anneal time $t_{an}$. The method of the present invention does not perform an extrapolation of one characteristic decay curve to determine another, as in both the '496 and the '931 patents. Moreover, and in contradistinction to both patent, the disclosed method only relies on data taken from one temperature in excess of the operating temperature, not two or more temperatures in excess of the operating temperature.

Scope of the Invention

Although the invention has been described and illustrated with respect to exemplary embodiments thereof, the foregoing and various other additions and omissions may be made therein and thereto without departing from the spirit and scope of the present invention.

We claim:

1. A method for annealing an optical waveguide having along some lengths an induced refractive index difference that decays over time and so causes drift in the wavelength of reflected light when light is inserted into the optical waveguide, the method using a decay formula for the induced refractive index difference indicating how the induced refractive index difference decays over time, the assumed decay formula having parameters that depend on temperature, the method comprising the steps of:
  a) determining the parameters in the decay formula for both an operating temperature and an annealing temperature, the annealing temperature being higher than the operating temperature, by fitting an observed decay over a measuring time at the operating temperature and at the annealing temperature; and
  b) determining an anneal time at the annealing temperature based on a maximum allowed drift of the wavelength of reflected light when the optical waveguide is held at a temperature of no more than the operating temperature.

2. The method of claim 1, wherein the step of determining the anneal time includes using the maximum allowed drift at the operating temperature first to determine an operating temperature time for decay at the operating temperature until a wavelength drift is less in magnitude than the magnitude of the maximum allowed drift, and determining the anneal time by equating the decay formula at the anneal time to a value for the induced refractive index difference given by the decay formula at the operating temperature time.

3. The method of claim 1, wherein the step of determining the parameters in the decay formula is accomplished by measuring a wavelength drift at the operating temperature and the annealing temperature, and deriving corresponding decay curves.

4. The method of claim 1, wherein the assumed decay formula is the following equation:

$$R(t) = \frac{\delta n(t)}{\delta n_0} = a\left(\frac{t}{t_0}\right)^{-b}$$

where: $R(t)$ is the normalized refractive index difference; $\delta n(t)$ is the refractive index difference at a time t; $\delta n_0$, is the refractive index difference at a reference time; $t_0$ is a normalization factor having the same units as the time t; and a and b are parameters describing the decay curve, parameters that depend on temperature, but not time.

5. A method according to claim 1, wherein the method further comprises a step of annealing the optical waveguide at the anneal temperature for the anneal time.

6. A method according to claim 1, wherein the method further comprises a step of using an optical fiber as the optical waveguide.

7. A method according to claim 1, wherein the method further comprises a step of using a large diameter waveguide cane or rod structure as the optical waveguide.

8. A method for annealing an optical waveguide having a radiation induced refractive index difference, comprising the steps of:
  a) determining an operating point on a decay curve having changes in the induced refractive index difference over time and being curve fit from data points measured at an operating temperature, the operating point corresponding to a time after which further change in the induced refractive index difference is less than or equivalent to a maximum acceptable change in the induced refractive index difference; and
  b) determining an anneal time on a corresponding decay curve that is curve fit from corresponding data points measured at an anneal temperature, which is greater than the operating temperature, the anneal time being sufficient for the induced refraction index to decay to the value indicated by the operating point.

9. A method according to claim 8, wherein the method further comprises a step of annealing the optical waveguide at the anneal temperature for the anneal time.

10. A method according to claim 8, wherein the step of determining the decay curve and the corresponding decay curve includes steps of curve fitting first and corresponding sets of actually measured data points using a decay curve formula:

$$\frac{\delta n(t)}{\delta n_0} = a\left(\frac{t}{t_0}\right)^{-b}$$

where: $\delta n(t)$ is the refractive index difference at a time t; $\delta n_0$ is the refractive index difference at a reference time; $t_0$ is a normalization factor having the same units as the time t; and a and b are temperature-dependent parameters having values $a_{op}$ and $b_{op}$ for the decay curve and values $a_{an}$ and $b_{an}$ for the corresponding decay curve.

11. A method according to claim 10, wherein the method includes steps of:
  a) determining the parameters $a_{op}$ and $b_{op}$ and the parameters $a_{an}$ and $b_{an}$ by measuring the decay curve and the corresponding decay curve at the operating temperature ($T_{op}$) and also at the anneal temperature ($T_{an}$) respectively over a relatively short predetermined period of time;
  b) determining the operating temperature time ($t_{op}$) using a wavelength drift specification; and
  c) determining the anneal time ($t_{an}$) using the decay curve equation at the anneal temperature ($T_{an}$) and the decay curve equation at the operating temperature ($T_{op}$).

12. A method according to claim 11, wherein the method includes the step of determining a wavelength shift during decay using an equation:

$$\delta\lambda(t)\left[\frac{\delta n(t)}{\delta n_0} - 1\right]\delta\lambda_{init},$$

where $\delta\lambda_{init}$ is the wavelength shift at a reference time.

13. A method according to claim 12, wherein the method includes the step of determining a wavelength drift using an equation:

$$D(t) = \frac{d}{dt}\delta\lambda(t) = \left\{\frac{d}{dt}\left[\frac{\delta n(t)}{\delta n_0}\right]\right\}\delta\lambda_{init}.$$

14. A method according to claim 13, wherein the maximum allowed wavelength drift is less than negative two picometers per year at 150° C.

15. A method according to claim 14, wherein the method includes the step of determining a required time to get to a stable point by using as a formula, $$\frac{t_{op}}{t_0} = \left\{\frac{D(t_{op})}{-\delta\lambda_{init}a_{op}b_{op}}\right\}^{-\frac{1}{b_{op}+1}}.$$

16. A method according to claim 15, wherein the method includes the step of determining the anneal time at the anneal temperature ($T_{an}$) by equating the values of the operating temperature ($T_{op}$) and the anneal temperature ($T_{an}$) and solving for the anneal time ($t_{an}$) using as a formula:

$$\frac{t_{an}}{t_0} = \left(\frac{a_{op}}{a_{an}}\right)^{-\frac{1}{b_{an}}}\left(\frac{t_{op}}{t_0}\right)^{\frac{b_{op}}{b_{an}}}.$$

17. A method according to claim 8, wherein the method further comprises a step of using an optical fiber as the optical waveguide.

18. A method according to claim 8, wherein the method further comprises a step of using a large diameter waveguide as the optical waveguide.

* * * * *

UNITED STATES PATENT AND TRADEMARK OFFICE
CERTIFICATE OF CORRECTION

PATENT NO. : 6,601,411 B2
DATED : August 5, 2003
INVENTOR(S) : Trevor W. MacDougall, Martin A. Putnam and Mark R. Fernald It is certified that error appears in the above-identified patent and that said Letters Patent is hereby corrected as shown below:

Column 1,
Line 62, "More specifically; the" should be -- More specifically, the --.

Column 2,
Line 66, "and βf both depend" should be -- and β both depend --.

Column 4,
Line 2, "values for κγ of" should be -- values for κ and γ of --.

Column 6,
Line 35, "curve at Tan and determine" should be -- curve at $T_{an}$ and determine --.

Column 8,
Line 61, "anneal point Pan in that" should be -- anneal point $P_{an}$ in that --.

Column 11,
Line 33, "at a time t; δn$_o$, is the" should be -- at a time t; δn$_o$ is the --.

Signed and Sealed this

Twenty-second Day of June, 2004

JON W. DUDAS
*Acting Director of the United States Patent and Trademark Office*